United States Patent
Mori

(10) Patent No.: US 11,108,965 B2
(45) Date of Patent: Aug. 31, 2021

(54) ELECTRONIC APPARATUS FOR CONTROLLING DISPLAY OF REMAINING POWER OF A BATTERY AND CONTROL METHOD FOR ELECTRONIC APPARATUS

(71) Applicant: CANON KABUSHIKI KAISHA, Tokyo (JP)

(72) Inventor: Naomi Mori, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/395,603

(22) Filed: Apr. 26, 2019

(65) Prior Publication Data
US 2019/0342504 A1 Nov. 7, 2019

(30) Foreign Application Priority Data
May 7, 2018 (JP) .............................. JP2018-089298

(51) Int. Cl.
*H04N 5/232* (2006.01)
*G09G 5/37* (2006.01)
*H02J 7/00* (2006.01)

(52) U.S. Cl.
CPC ......... *H04N 5/232941* (2018.08); *G09G 5/37* (2013.01); *H02J 7/00* (2013.01); *H02J 7/0047* (2013.01); *H04N 5/23241* (2013.01); *G09G 2330/026* (2013.01); *G09G 2330/027* (2013.01);
(Continued)

(58) Field of Classification Search
None
See application file for complete search history.

(56) References Cited

U.S. PATENT DOCUMENTS 5,712,795 A * 1/1998 Layman ................ H02J 7/0071
700/297
5,809,449 A * 9/1998 Harper ............... G01R 31/3648
702/63

(Continued)

FOREIGN PATENT DOCUMENTS

JP 2008-193784 A 8/2008
JP 2011250652 A * 12/2011 .............. H02J 7/00

OTHER PUBLICATIONS

JP2011250652A; Electronic Apparatus and Program; Oki Koichiro, Dec. 2011, pp. 1-4; English Translation (Year: 2011).*

*Primary Examiner* — Cynthia Segura
(74) *Attorney, Agent, or Firm* — Cowan, Liebowitz & Latman, P.C.

(57) ABSTRACT

An electronic apparatus comprising: an operation member configured to give an instruction to switch a power-on state and a power-off state; a detector configured to detect mounting of a battery on a battery mounting unit; and a memory and at least one processor and/or at least one circuit to perform the operations of the following units: first control unit configured to display remaining power of the battery on a display unit in a first display appearance in case where the electronic apparatus is in the power-on state; and a second control unit configured to perform control to display the remaining power of the battery on the display unit in a second display appearance with finer granularity than the first display appearance in case where the electronic apparatus is in the power-off state and the mounting of the battery is detected by the detector.

19 Claims, 9 Drawing Sheets

(52) U.S. Cl.
CPC .... *G09G 2340/0407* (2013.01); *H02J 7/0048* (2020.01)

(56) References Cited

U.S. PATENT DOCUMENTS

| | | | | |
|---|---|---|---|---|
| 6,252,511 | B1* | 6/2001 | Mondshine | G06F 1/1616 340/636.1 |
| 6,396,407 | B1* | 5/2002 | Kobayashi | H02J 7/0047 340/636.12 |
| 9,939,872 | B2* | 4/2018 | Graham | G06F 1/163 |
| 2002/0012048 | A1* | 1/2002 | Yamagishi | H04N 1/00307 348/207.99 |
| 2002/0054232 | A1* | 5/2002 | Inagaki | H04N 1/2125 348/372 |
| 2007/0121536 | A1* | 5/2007 | Aihara | H04W 48/18 370/318 |
| 2010/0245102 | A1* | 9/2010 | Yokoi | H01M 10/488 340/636.16 |
| 2011/0039605 | A1* | 2/2011 | Choi | H02J 7/342 455/573 |
| 2011/0128007 | A1* | 6/2011 | Nishidai | H02J 7/0047 324/427 |
| 2011/0134097 | A1* | 6/2011 | Sugamata | G06F 1/3287 345/211 |
| 2011/0195723 | A1* | 8/2011 | Kim | H04M 1/72544 455/456.1 |
| 2014/0111142 | A1* | 4/2014 | Lee | G06F 1/3206 320/107 |
| 2014/0267316 | A1* | 9/2014 | Connell | G06F 9/5044 345/503 |
| 2016/0205427 | A1* | 7/2016 | Yoon | G06F 3/0482 725/34 |
| 2017/0142339 | A1* | 5/2017 | Kim | H04N 5/23241 |
| 2018/0123379 | A1* | 5/2018 | Ha | H02J 50/12 |
| 2018/0241233 | A1* | 8/2018 | Kimura | B41J 29/393 |
| 2018/0366057 | A1* | 12/2018 | Shen | G09G 3/3208 |
| 2019/0260944 | A1* | 8/2019 | Ogawa | H04N 9/8233 |

* cited by examiner

ELECTRONIC APPARATUS FOR CONTROLLING DISPLAY OF REMAINING POWER OF A BATTERY AND CONTROL METHOD FOR ELECTRONIC APPARATUS

BACKGROUND OF THE INVENTION

Field of the Invention

The present invention relates to an electronic apparatus and a control method for the electronic apparatus.

Description of the Related Art

In battery remaining power display in an electronic apparatus such as a digital camera, there is known a method of simple battery remaining power display (simple display) indicating that, which of a plurality of stages with rough granularity such as approximately four stages, the battery remaining power of a power supply device corresponds to, using a battery mark. There is also known a method of displaying the battery remaining power more in detail with finer granularity than the battery mark, using percentage, a voltage or the like (detailed display).

Japanese Patent Application Laid-Open No. 2008-193784 discloses that, when an appropriate power supply device is attached to an electronic apparatus, the electronic apparatus shifts to a normal operation mode, displays battery remaining power in detail in an information display unit and, at the same time, simply displays the battery remaining power in a photographing-information display unit, which is a display unit different from the information display unit.

SUMMARY OF THE INVENTION

However, if the detailed display is continued during use of the electronic apparatus, the battery remaining power changes every moment. For example, it is likely that wrong battery remaining power is displayed because of the influence of a temporary voltage drop or the like. Therefore, remaining power display of the battery cannot be performed in an appropriate display appearance according to a state of use of the electronic apparatus.

Therefore, an object of the present invention is to provide an electronic apparatus, a control method for the electronic apparatus, a program, and a storage medium that can perform remaining power display of a battery in a more appropriate display appearance according to a state of use of the electronic apparatus.

An aspect of the present invention is an electronic apparatus comprising:

an operation member configured to give an instruction to switch a power-on state and a power-off state;

a detector configured to detect mounting of a battery on a battery mounting unit; and a memory and at least one processor and/or at least one circuit to perform the operations of the following units:

a first control unit configured to display remaining power of the battery on a display unit in a first display appearance in case where the electronic apparatus is in the power-on state; and a second control unit configured to perform control to display the remaining power of the battery on the display unit in a second display appearance with finer granularity than the first display appearance in case where the electronic apparatus is in the power-off state and the mounting of the battery is detected by the detector.

According to the present invention, it is possible to perform remaining power display of the battery in a more appropriate display appearance according to a state of use of the electronic apparatus.

Further features of the present invention will become apparent from the following description of exemplary embodiments with reference to the attached drawings.

DESCRIPTION OF THE EMBODIMENTS

Illustrative embodiments of the present invention are explained in detail below with reference to the drawings. The technical scope of the present invention is decided by the claims and is not limited by the following individual embodiments. Not all of combinations of features explained in the embodiments are essential for the present invention.

First Embodiment

In a first embodiment, an electronic apparatus that determines whether display of battery remaining power is performed as simple display, detailed display, or hiding according to a change in a state of a power supply, a change in a state of charging, and the like is explained. The electronic apparatus can perform the detailed display when a user should confirm the battery remaining power in detail and perform the simple display or the hiding with less power consumption of the battery in other cases. In the following explanation, a digital camera is explained as an example of the electronic apparatus according to this embodiment. However, the electronic apparatus is not limited to the digital camera and may be any electronic apparatus that can operate using a battery and display battery remaining power such as a smartphone and a personal computer. The electronic apparatus itself does not need to perform the display of the battery remaining power. The electronic apparatus may control an external display device or the like to display the battery remaining power.

(Exterior of the Digital Camera)

Figure 1:
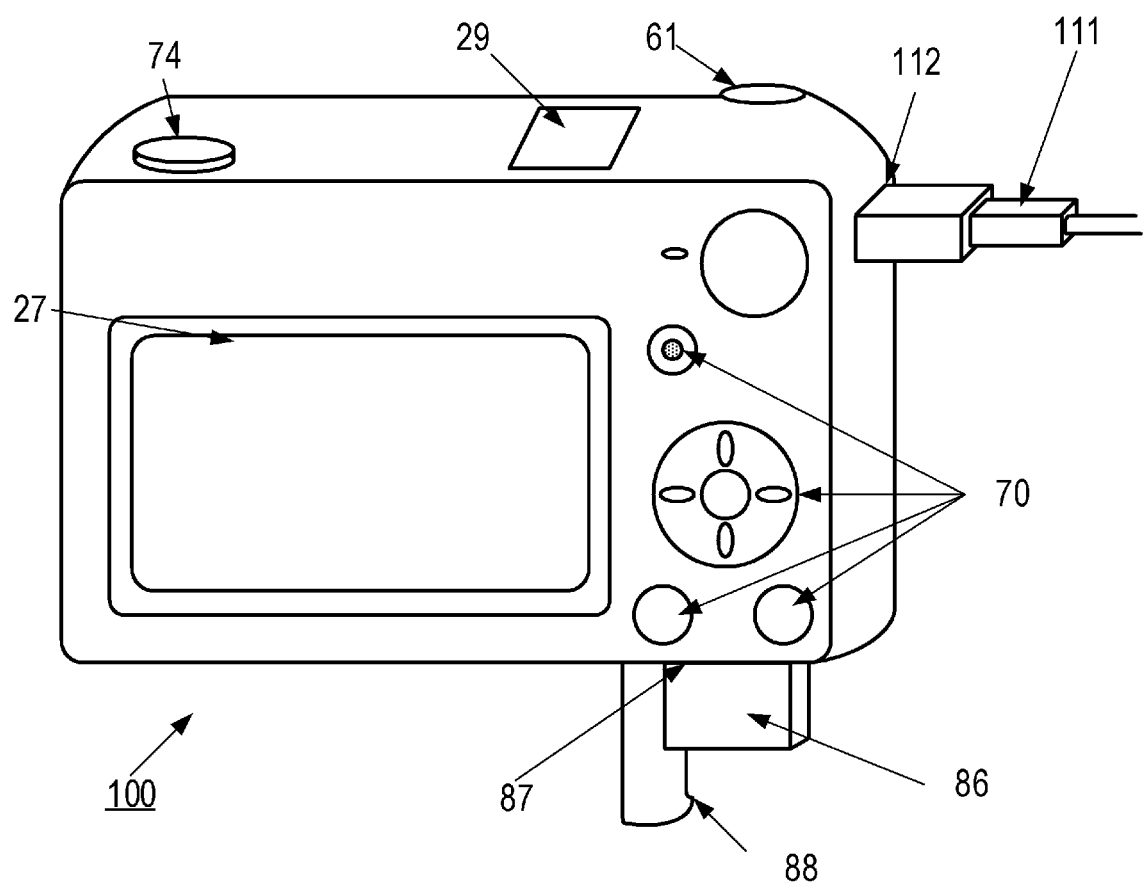
FIG. 1 is an exterior view of a digital camera according to a first embodiment.

An exterior view of a digital camera 100 according to this embodiment is shown in FIG. 1. A liquid crystal monitor 27 is a display unit that displays various kinds of information such as an image and battery remaining power. A display panel 29 is a display unit provided on a camera upper surface and is a display unit that displays various kinds of information such as the battery remaining power. A shutter button 61 is an instructing unit for performing a photographing instruction. A connector 112 is a connector unit for a connection cable 111 for supplying electric power and the digital camera 100. An instructing unit 70 is an instructing unit configured by operation members such as various switches, buttons, a dial, and a touch panel that receive various kinds of operation from a user. A power switch 74 is a lever unit for switching a power-on state and a power-off state of the digital camera 100. A battery 86 supplies electric power to the digital camera 100. A battery slot 87 is a battery mounting unit (a battery slot) for housing the battery 86. A lid 88 is a lid unit of the battery slot 87. In FIG. 1, a state is shown in which the lid 88 is opened and a part of the battery 86 is taken out and exposed from the battery slot 87.

(Configuration of the Digital Camera)

Figure 2:
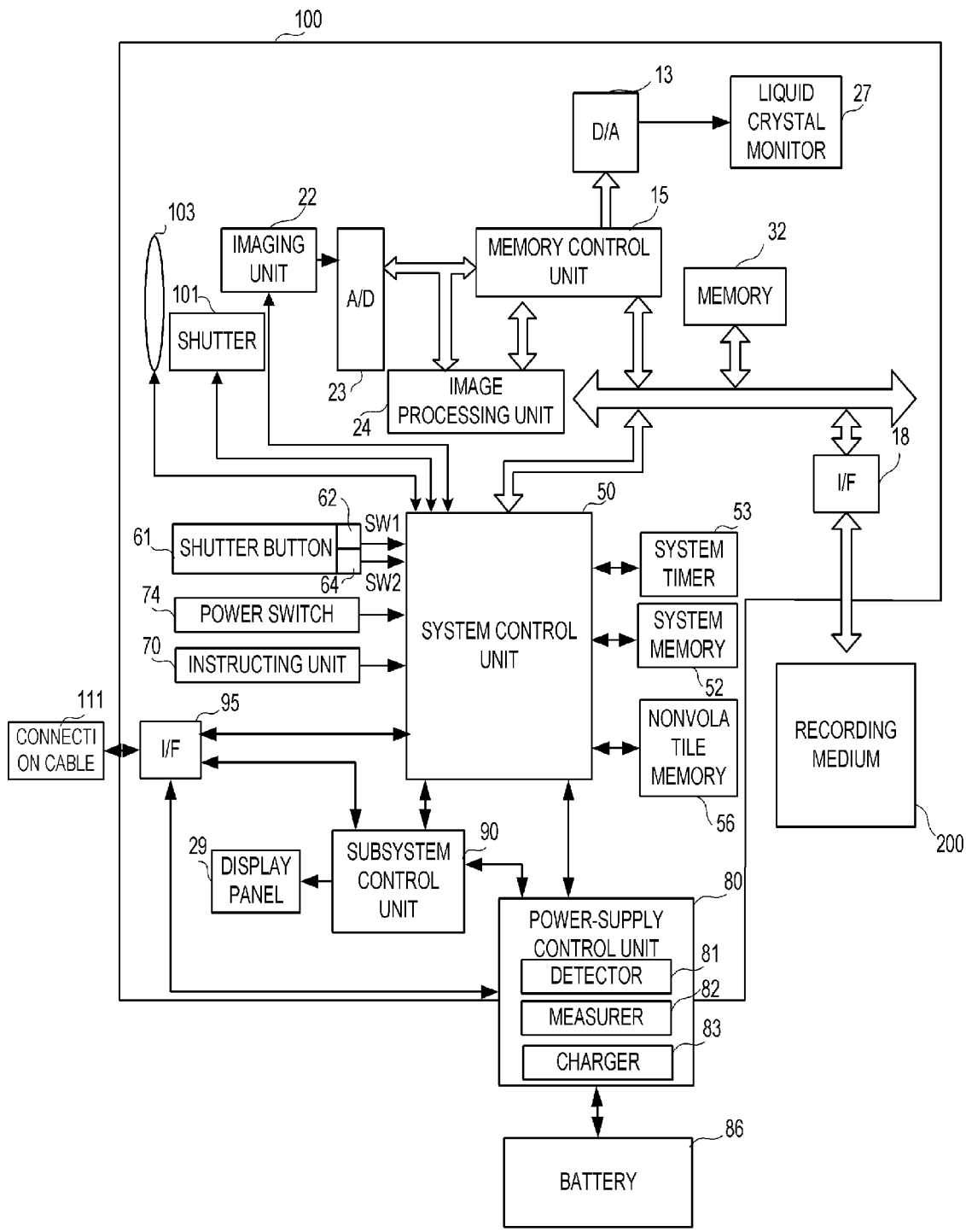
FIG. 2 is a configuration diagram of the digital camera according to the first embodiment.

FIG. 2 is a configuration diagram (a block diagram) showing a configuration example of the digital camera 100 according to this embodiment. A photographing lens 103 is a lens group including a zoom lens and a focus lens. A shutter 101 is a shutter including an aperture function. An imaging unit 22 is an imaging element configured by a CCD (Charge Coupled Device), a CMOS (Complementary MOS) element, or the like that converts an optical image into an electric signal. An A/D converter 23 converts an analog signal into a digital signal. The imaging unit 22 is capable of imaging (photographing) an object when the imaging unit 22 is in a photographing state among the photographing state, a photographing standby state, a reproducing state, and a setting state. The A/D converter 23 is used to convert an analog signal output from the imaging unit 22 into a digital signal.

An image processing unit 24 performs resize processing such as predetermined pixel interpolation and reduction and color conversion processing on data received from the A/D converter 23 or data received from a memory control unit 15. The image processing unit 24 performs predetermined arithmetic processing using captured image data. A system control unit 50 performs exposure control and distance measurement control on the basis of an obtained arithmetic operation result. Consequently, AF (autofocus) processing, AE (automatic exposure) processing, and EF (flash pre-light emission) processing of a TTL (through the lens) scheme are performed. The image processing unit 24 further performs predetermined arithmetic processing using the captured image data and performs AWB (auto white balance) processing of the TTL scheme on the basis of an obtained arithmetic operation result.

Output data from the A/D converter 23 is written in a memory 32 via the image processing unit 24 and the memory control unit 15 or via the memory control unit 15. The memory 32 stores image data obtained by the imaging unit 22 and converted into digital data by the A/D converter 23 and image data to be displayed on the liquid crystal monitor 27. The memory 32 has a storage capacity sufficient for storing a predetermined number of still images and a moving image and sound in a predetermined time. The memory 32 also functions as a memory (a video memory) for image display.

A D/A converter 13 converts data for image display stored in the memory 32 into an analog signal and supplies the analog signal to the liquid crystal monitor 27. In this way, the data for image display written in the memory 32 is displayed by the liquid crystal monitor 27 via the D/A converter 13.

The liquid crystal monitor 27 performs display corresponding to the analog signal received from the D/A converter 13 on a display device such as an LCD (Liquid Crystal Display). The D/A converter 13 converts the digital signal A/D-converted by the A/D converter 23 and accumulated in the memory 32 into an analog signal, sequentially transfers the analog signal to the liquid crystal monitor 27, and performs display on the liquid crystal monitor 27. Consequently, through-image display (live-view display) shown in (J) of FIG. 3 can be performed.

A nonvolatile memory 56 is a memory functioning as an electrically erasable recordable recording medium (storage medium). For example, an EEPROM (Electrically Erasable Programmable Read-Only Memory) or the like is used. Constants, programs, and the like for the operation of the system control unit 50 and a subsystem control unit 90 are stored in the nonvolatile memory 56. The programs refer to computer programs for executing processing indicated by various flowcharts explained below.

The system control unit 50 controls the entire digital camera 100. The system control unit 50 executes the programs recorded in the nonvolatile memory 56 to realize various kinds of processing explained below. A RAM is used as a system memory 52. Constants and variables for the operation of the system control unit 50 and the subsystem control unit 90, the programs read out from the nonvolatile memory 56, and the like are developed in the system memory 52. A system timer 53 is a clocking unit that measures a time used for various kinds of control by the system control unit 50 and the subsystem control unit 90 and a time of an incorporated clock. The system control unit 50 controls the memory 32, the D/A converter 13, the liquid crystal monitor 27, and the like to thereby perform display control as well. In this embodiment, it is assumed that the system control unit 50 does not operate unless the subsystem control unit 90 (another functional unit) performs control if the digital camera 100 is in the power-off state. However, the system control unit 50 may operate even in the power-off state.

The shutter button 61, the instructing unit 70, and the power switch 74 are operation members for inputting various operation instructions to the system control unit 50. The shutter button 61 includes a first shutter switch 62 and a second shutter switch 64.

So-called half press (a photographing preparation instruction) is performed on the first shutter switch 62 halfway in operation of the shutter button 61 provided in the digital camera 100, whereby the first shutter switch 62 generates a first shutter switch signal SW1. The digital camera 100 starts an operation of the AF (autofocus) processing, the AE (automatic exposure) processing, the AWB (auto white balance) processing, the EF (flash pre-light emission) processing, and the like according to the first shutter switch signal SW1.

So-called full pressing (a photographing instruction) is performed on the second shutter switch 64 at the completion of the operation of the shutter button 61, whereby the second shutter switch 64 generates a second shutter switch signal SW2. The system control unit 50 starts an operation of a series of photographing processing from signal readout from the imaging unit 22 to writing of image data in a recording medium 200 according to the second shutter switch signal SW2.

For example, various function icons displayed on the liquid crystal monitor 27, the display panel 29, and the like are selected, whereby functions are allocated to the operation members of the instructing unit 70 as appropriate for each scene. The operation members act as various function buttons. As the function buttons, there are, for example, an end button, a return button, an image feed button, a jump button, a narrow-down button, and an attribute changing button. For example, when a menu button is pressed, a menu screen, on which various kinds of setting are possible, is displayed on the liquid crystal monitor 27 or the like. The user can intuitively perform the various kinds of setting using the menu screen displayed on the liquid crystal monitor 27 or the like, up and down and left and right four-direction buttons, and a SET button.

The power switch 74 is a switch with which the user instructs a start and an end of the operation of the digital camera 100. That is, the power switch 74 can give an instruction to switch the digital camera 100 to the power-on state and the power-off state. The power switch 74 can operate a power supply of a digital camera. Therefore, the power switch 74 is considered an operation member in this embodiment.

The subsystem control unit 90 is at least one processor that performs control of a part of the digital camera 100 such as display control of the display panel 29 and power supply control. The subsystem control unit 90 is capable of performing processing of the display control of the display panel 29 and the power supply control even when the system control unit 50 is not operating. The subsystem control unit 90 consumes less electric power than the system control unit 90. Because, the subsystem control unit 90 has a clock frequency lower than a clock frequency of the system control unit 50. Power consumption of the subsystem control unit 90 is sufficiently small compared with the system control unit 50. In this embodiment, when the power switch 74 is switched from ON to OFF, the digital camera 100 is switched from the power-on state in which the system control unit 50 operates to the power-off state (a low power consumption state) in which the control unit 50 stops and the subsystem control unit 90 operates.

Figure 3:
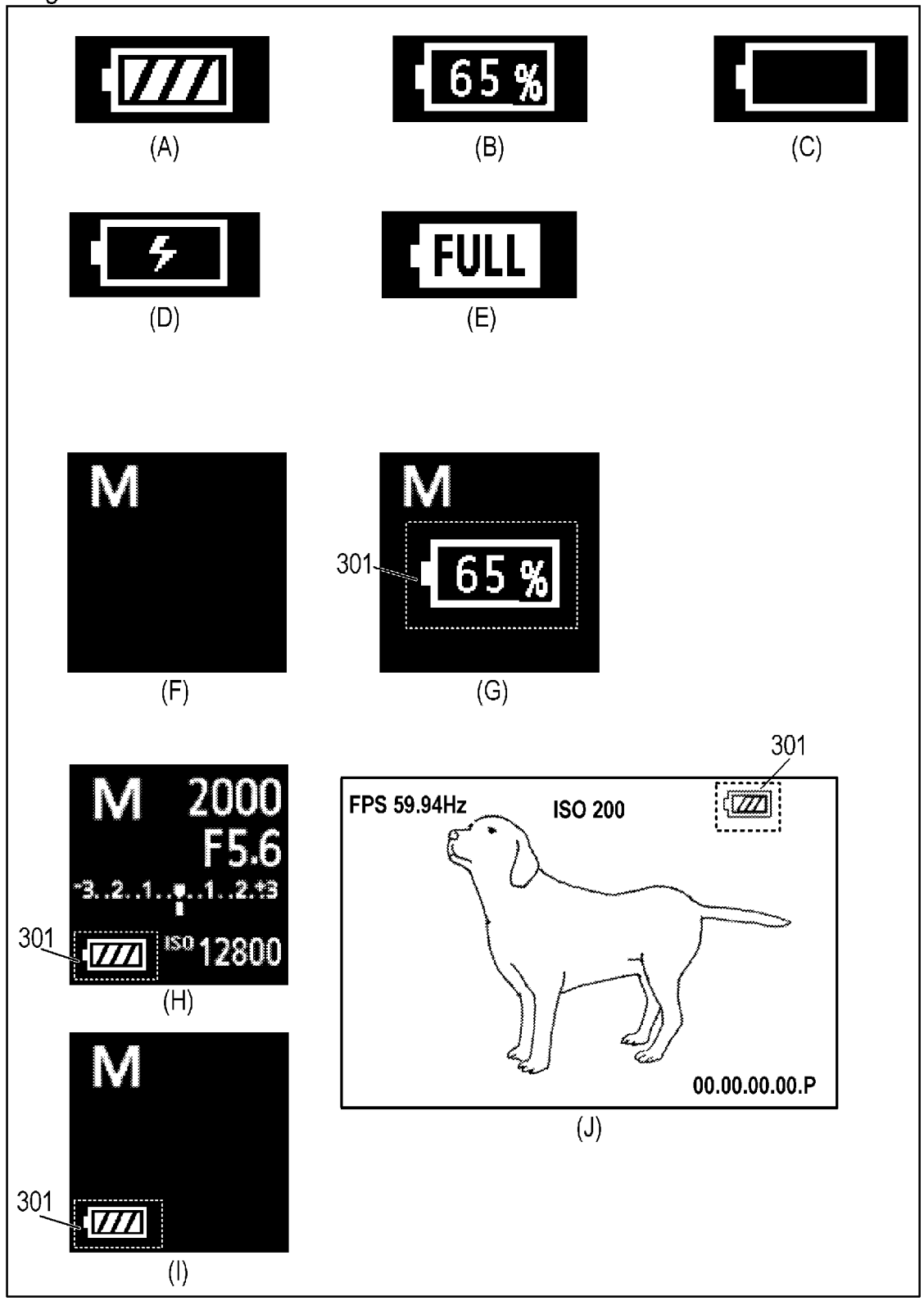
FIG. 3 is a diagram showing remaining power display of a battery according to the first embodiment.

The display panel 29 displays, on the display device such as the LCD, for example, a state of the digital camera 100 shown in (H) of FIG. 3 according to an instruction from the subsystem control unit 90. Battery remaining power display during power-off in this embodiment is realized by the subsystem control unit 90 performing the display control of the display panel 29 and the power supply control without the system control unit 50 operating when the power switch 74 in the OFF state. The display panel 29 is dot-matrix liquid crystal and can display various shapes in dot representation. The display panel 29 is a display that has resolution (the number of pixels and the number of dots) lower than the resolution of the liquid crystal monitor 27 and cannot perform color display of three or more colors and performs display in two values of black and white. Therefore, the display panel 29 cannot perform high-definition display compared with the liquid crystal monitor 27.

The display panel 29 and the system control unit 50 may be connected such that the system control unit 50 performs the display control of the display panel 29. In this case, when the subsystem control unit 90 detects that an event in which display update of the display panel 29 should be performed occurs during the operation of the subsystem control unit 90, the subsystem control unit 90 temporarily issues an operation (start) command for the system control unit 50. The system control unit 50 receives the operation command (control), temporarily operates, updates the display of the display panel 29 according to the event, and thereafter stops the operation and changes to the OFF state. Thereafter, the subsystem control unit 90 performs control to maintain a display state of the display panel 29. That is, the display panel 29 is a nonvolatile display that can maintain the display state (can display an image) even in the OFF state in which the system control unit 50 is not operating. However, the display panel 29 may be a display on which display disappears when the operation of the subsystem control unit 90 stops or may be a display on which display does not disappear even if the operation of the subsystem control unit 90 stops.

A power-supply control unit 80 is configured by a battery detection circuit, a DC-DC converter, a switch circuit that switches a block to be energized, and the like. The power-supply control unit 80 performs detection of presence or absence of mounting of the battery 86 on the battery slot 87, a type of the battery 86, and detection of battery remaining power, and charging of the battery 86. The power-supply control unit 80 controls the DC-DC converter on the basis of a result of the detection and an instruction of the system control unit 50 and supplies a necessary voltage to functional units including the recording medium 200 for a necessary period. The power-supply control unit 80 includes a detector 81 that detects attachment and detachment of the battery 86 to and from (mounting of the battery 86 on) the battery slot 87 (the battery mounting unit), a measurer 82 that measures a residual capacity of the battery 86, and a charger 83 that charges the battery 86 using electric power obtained from a connection cable 111 explained below.

The battery 86 is configured from a primary battery such as an alkali battery or a lithium battery, a secondary battery such as an NiCd (Nickel-Cadmium) battery, an NiMH (Nickel Metal-Hydride) battery, or a lithium battery, an AC adapter, or the like. It is assumed that the battery 86 in this embodiment is chargeable and dischargeable.

A connection cable I/F 95 is an interface with the connection cable 111. The connection cable 111 is a cable that connects the digital camera 100 to a personal computer, a printer, and a charger. By connecting the digital camera 100 using the connection cable 111, it is possible to access the recording medium 200 in the digital camera 100 from the personal computer and view an image and connect the digital camera 100 to the printer and operate the digital camera 100 to output an image in the digital camera 100 to the printer. Since the connection cable 111 is connected to the personal computer and the charger, electric power is provided from the personal computer and the like. The battery 86 can be charged via the charger 83.

A recording medium I/F 18 is an interface with the recording medium 200 such as a memory card or a hard disk. The recording medium 200 is a recording medium (a storage medium) such as a memory card for recording a photographed image. The recording medium 200 is configured from a semiconductor memory, an optical disk, a magnetic disk, or the like.

(Battery Remaining Power Display)

Display of battery remaining power in this embodiment is explained with reference to FIG. 3. (A) to (E) of FIG. 3 are examples of marks indicating states of the battery 86. The marks are displayed on the display panel 29 and the liquid crystal monitor 27. (F) to (I) of FIG. 3 show display examples of images displayed on the display panel 29 according to states of the power switch 74. (J) of FIG. 3 shows a display example of an image displayed on the liquid crystal monitor 27 when the power switch 74 is in the ON state. The display examples shown in (A) to (J) of FIG. 3 are explained in detail below.

((Marks of the Battery Remaining Power Display))

(A) to (C) of FIG. 3 are display examples of battery remaining power of the battery 86. In this embodiment, (A) to (C) of FIG. 3 are images displayed when charging of the battery 86 is not performed. (A) of FIG. 3 is a display example of battery remaining power with rough granularity (an example of simple display) and shows which of four stages, the battery remaining power corresponds to, using a pattern of a battery mark. In this embodiment, display appearances with rough granularity displayed using the battery mark are not limited to the four stages shown in (A) of FIG. 3 but are a plurality of stages sufficiently less than percentage points and are equal to or less than ten stages. By displaying the battery remaining power in a small number of stages in this way, it is possible to prevent inaccurate remaining power display and a sudden change of remaining power display that occur because of the influence of a temporary voltage drop or the like due to fluctuation in power consumption during use. The display of the battery remaining power with rough granularity is considered to be an example of display by a first control unit. In this embodiment, the first control unit may be one or both of the system control unit 50 and the subsystem control unit 90.

(B) of FIG. 3 is a detailed battery remaining power display example (an example of detailed display). Battery remaining power is displayed in finer granularity than the display of the battery remaining power shown in (A) of FIG. 3. In this embodiment, the battery remaining power is displayed in a percentage form. That is, (B) of FIG. 3 shows which of one hundred stages, the battery remaining power corresponds to. The detailed battery remaining power display does not need to be the one hundred stages and only has to be sufficiently larger than the number of stages of the battery remaining power display with rough granularity such as the number of stages that is a predetermined multiple of the number of stages of the battery remaining power display with rough granularity. Therefore, the battery remaining power display with fine granularity is considered to be display having a larger information amount than the battery remaining power display with rough granularity. The battery remaining power display with rough granularity is considered to be display with less influence of a temporary voltage drop or the like due to fluctuation in power consumption during use than the battery remaining power display with fine granularity. The display of the battery remaining power with fine granularity is considered to be an example of display by a second control unit. In this embodiment, the second control unit may be one or both of the system control unit 50 and the subsystem control unit 90. The display of the battery remaining power with rough granularity and the display of the battery remaining power with fine granularity may be performed by the same unit (control unit) or may be performed by different units.

(C) of FIG. 3 is a display example at the time when battery remaining power cannot be obtained from the battery 86 because of a reason such as a communication failure. Nothing is drawn in a battery mark. As the display performed when battery remaining power cannot be obtained, "?" or the like may be drawn in the battery mark.

(D) and (E) of FIG. 3 are display examples representing charging states of the battery 86. That is, when the charging of the battery 86 is performed, (D) or (E) of FIG. 3 is more preferentially displayed than (A) to (C) of FIG. 3.

(D) of FIG. 3 is a display example at the time when the battery 86 is charged via the charger 83 by power supply from the connection cable 111 in a state in which the connection cable 111 is connected to the digital camera 100. The display may be any display such as display of characters "Charge" if the display is display for indicating that the battery 86 is charged. However, in this embodiment, a lightening mark is drawn in the battery mark.

(E) of FIG. 3 is a display example at the time when the battery 86 cannot be charged more than the present state (in the case of full-charge) in the state in which the connection cable 111 is connected to the digital camera 100. The display may be any display if the display is display for indicating the full-charge. However, in this embodiment, characters "FULL" are drawn in the battery mark.

((Battery Remaining Power Display in the Power-Off State))

(F) and (G) of FIG. 3 are examples of images displayed on the display panel 29 in a state in which the power switch 74 is off. The liquid crystal monitor 27 displays nothing in the state in which the power switch 74 is off. In the state in which the power switch 74 is off, according to a state of the digital camera 100, any one of (A) to (E) of FIG. 3 is displayed in a display item 301 indicating a state of the battery 86 in the display panel 29.

(F) of FIG. 3 is a display example at a normal time (not immediately after battery mounting) on the display panel 29 in the power-off state. It is necessary to always monitor a state of the battery 86 to display battery remaining power. However, electric power is consumed if the battery 86 is continuously monitored by the subsystem control unit 90. Therefore, the battery remaining power is not displayed at the normal time. Consequently, it is possible to reduce the power consumption.

(G) of FIG. 3 is a display example at the time when battery remaining power is temporarily displayed, for example, immediately after battery mounting. Specifically, (G) of FIG. 3 shows an example of battery remaining power display in the detailed display appearance shown in a percentage form explained with reference to (B) of FIG. 3.

((Battery Remaining Power Display in the Power-On State))

(H) to (J) of FIG. 3 are examples of images displayed on the display panel 29 or the liquid crystal monitor 27 in a state in which the power switch 74 is on. In the state in which the power switch 74 is on, according to the state of the digital camera 100, any one of (A) to (E) of FIG. 3 is displayed in the display item 301 indicating a state of the battery 86 in the display panel 29 or the liquid crystal monitor 27.

(H) and (I) of FIG. 3 are examples of images displayed on the display panel 29 in the state in which the power switch 74 is on. Battery remaining power indicated by the display item 301 in (H) and (I) of FIG. 3 is displayed in the display appearance with rough granularity explained with reference to (A) of FIG. 3. Specifically, (H) of FIG. 3 is a display example of the photographing state and the photographing standby state. Various kinds of camera setting necessary for photographing such as shutter speed and ISO sensitivity can be confirmed in addition to the battery remaining power display. (I) of FIG. 3 is a display example of a reproducing and setting state. The various kinds of camera setting necessary for photographing are not displayed.

(J) of FIG. 3 is an example of an image displayed on the liquid crystal monitor 27 in the photographing state and the photographing standby state in the state in which the power switch 74 is on. In (J) of FIG. 3, battery remaining power indicated by the display item 301 is displayed together with an image of a photographing target. The display of the battery remaining power is the display appearance with rough granularity explained with reference to (A) of FIG. 3.

(Flow of Battery Remaining Power Display in the Power-Off State)

Figure 4:
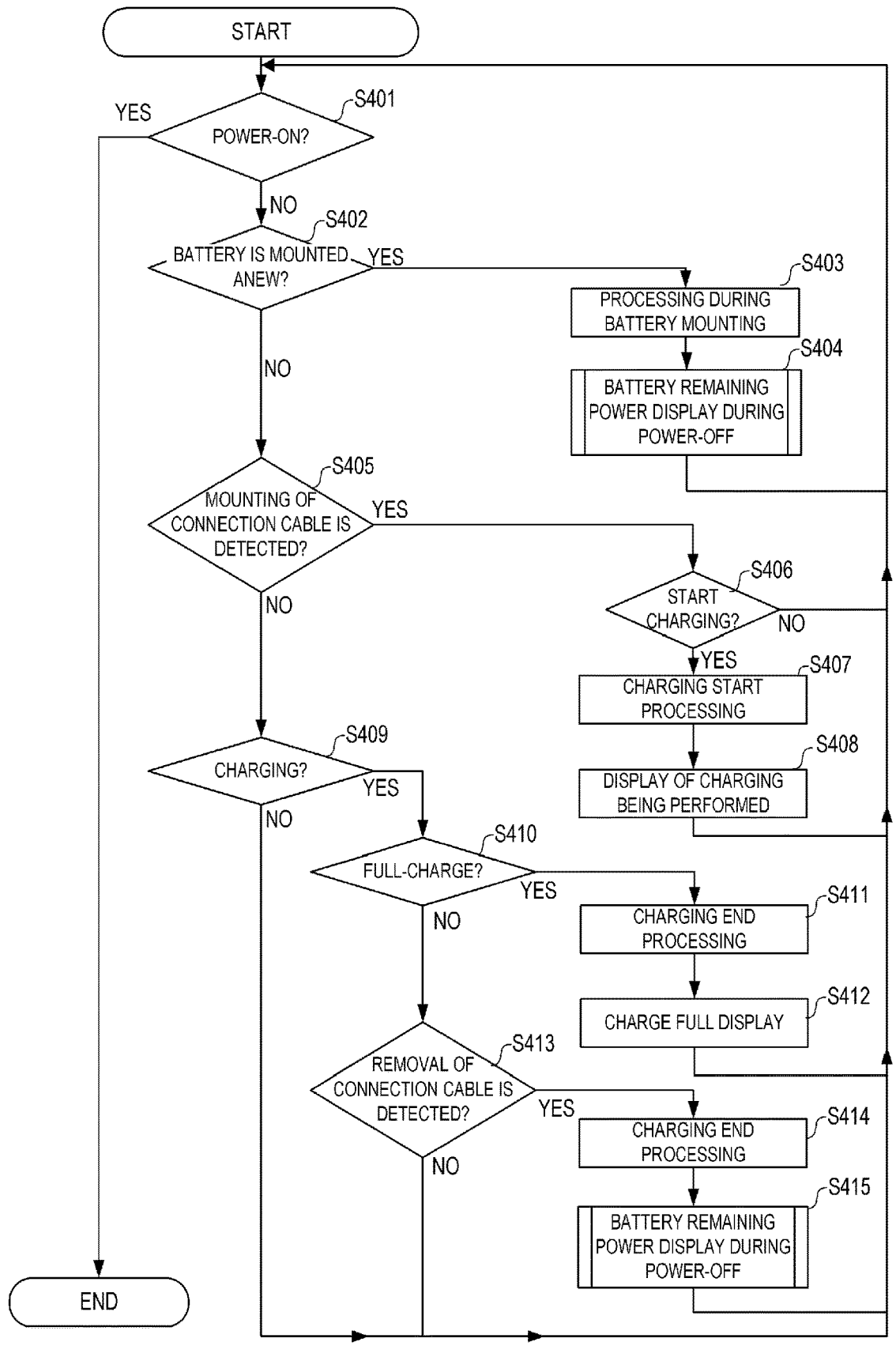
FIG. 4 is a display flowchart of battery remaining power in a power-off state according to the first embodiment.

A control method for battery remaining power display in the OFF state of the power switch 74 is explained with reference to flowcharts of FIGS. 4 and 5. First, main processing of the battery remaining power display in the OFF state of the power switch 74 is explained with reference to the flowchart of FIG. 4. This processing is realized by the subsystem control unit 90 developing, in the system memory 52, a program recorded in the nonvolatile memory 56 and executing the program. A start state of the flowchart of FIG. 4 is the state in which the power switch 74 is off. In this embodiment, if the power switch 74 is off, no battery remaining power display is performed (non-display) on the display panel 29 and the liquid crystal monitor 27 unless specifically described below.

In S401, the subsystem control unit 90 determines whether the power switch 74 is operated and switching to the power-on state is instructed. The process ends the processing when the instruction to switch to the power-on state is given. The process transitions to S402 when the instruction to switch to the power-on state is not given.

In S402, the subsystem control unit 90 controls the detector 81 to determine (detect) whether the battery 86 is mounted on the battery slot 87 anew. The detector 81 detects mounting action of the battery 86. The process transitions to S403 when the battery 86 is mounted anew and transitions to S405 when the battery 86 is not mounted anew.

In S403, the subsystem control unit 90 performs processing during battery mounting such as determination of states of the instructing unit 70 and the power switch 74.

In S404, the subsystem control unit 90 temporality displays battery remaining power. The process transitions to S401. S404 is explained in detail below with reference to FIG. 5.

In S405, the subsystem control unit 90 determines whether the connection cable 111 for charging the battery 86 is mounted on the connection cable I/F 95 anew. The process transitions to S406 when the connection cable 111 is mounted anew and transitions to S409 when new mounting is not detected.

In S406, the subsystem control unit 90 determines whether to start charging of the battery 86 on the basis of states of the battery 86 and the connection cable 111. The process transitions to S407 when the charging of the battery 86 is started and transitions to S401 when the charging is not started. For example, the subsystem control unit 90 determines not to start the charging of the battery 86 when a voltage of electric power supplied from the connection cable 111 is equal to or smaller than a predetermined value.

In S407, the subsystem control unit 90 instructs the charger 83 to start the charging to the battery 86.

In S408, the subsystem control unit 90 displays to the effect that the charging is being performed on the display panel 29 as shown in (D) of FIG. 3. The process transitions to S401.

In S409, the subsystem control unit 90 determines whether the charger 83 is charging the battery 86. The process transitions to S410 when the charger 83 is charging and transitions to S401 when the charger 83 is not charging.

In S410, the subsystem control unit 90 determines whether a charging state of the battery 86 is full-charge. The process transitions to S411 when the charging state is the full-charge and transitions to S413 when the charging state is not the full-charge.

In S411, the subsystem control unit 90 instructs the charger 83 to stop the charging to the battery 86.

In S412, the subsystem control unit 90 displays to the effect that the charging state is the full-charge on the display panel 29 as shown in (E) of FIG. 3. The process transitions to S401.

In S413, the subsystem control unit 90 determines whether the connection cable 111 for charging the battery 86 is removed from the connection cable I/F 95. The process transitions to S414 when the connection cable 111 is removed and transitions to S401 when the connection cable 111 is not removed. The process may transition to S411 when the voltage of the electric power supplied from the connection cable 111 is equal to or smaller than the predetermined value and transition to S401 when the voltage is larger than the predetermined value rather than according to whether the connection cable 111 is removed.

In S414, the subsystem control unit 90 instructs the charger 83 to stop (suspend) the charging to the battery 86.

In S415, the subsystem control unit 90 temporarily displays battery remaining power. The process transitions to S401. That is, when the charger 83 controlled by the subsystem control unit 90 stops (suspends) the charging to the battery 86, the temporary display of the battery remaining power is performed. S415 is explained in detail below with reference to FIG. 5.

((Detailed Flow of Battery Remaining Power Display))

Details of the display processing of the battery remaining power in the power-off state corresponding to S404 and S415 explained above and S618 explained below are explained with reference to a flowchart of FIG. 5. Processing for displaying the battery marks shown in (A) to (C) of FIG. 3 on the display panel 29 is performed. This processing is realized by the subsystem control unit 90 developing, in the system memory 52, a program recorded in the nonvolatile memory 56 and executing the program.

In S501, the subsystem control unit 90 controls the measurer 82 to measure (acquire) remaining power of the battery 86.

In S502, the subsystem control unit 90 determines whether a value of battery remaining power is acquired in S501. The process transitions to S504 when battery remaining power is acquired and transitions to S503 when battery remaining power is not acquired.

In S503, the subsystem control unit 90 displays to the effect that the battery is uncommunicable (displays to the effect that battery remaining power cannot be acquired) as shown in (C) of FIG. 3. The process transitions to S507.

In S504, the subsystem control unit 90 determines granularity of the battery remaining power measured in S501. The process transitions to S506 when the battery remaining power is acquired at granularity finer than predetermined granularity and transitions to S505 when the battery remaining power is acquired at granularity rougher than the predetermined granularity. In this embodiment, for example, the subsystem control unit 90 determines the granularity of the battery remaining power according to whether the remaining power of the battery 86 is acquired at fineness equal to or higher than granularity in one hundred stages. In this embodiment, since S504 is exceptional processing, the process transitions to S506, for example, unless an abnormal situation such as noise in the remaining power of the battery 86 that should be acquired occurs because of some reason.

In S505, the subsystem control unit 90 displays battery remaining power with rough granularity shown in (A) of FIG. 3 on the display panel 29. The process transitions to S507.

In S506, the subsystem control unit 90 displays detailed battery remaining power shown in (B) of FIG. 3 on the display panel 29. The process transitions to S507.

In S507, the subsystem control unit 90 determines whether a predetermined period (time) has elapsed from the display of the battery remaining power on the display panel 29 in S503, S505, and S506. The process transitions to S508 when the predetermined period has elapsed and stays on standby in S507 until the predetermined period elapses and thereafter transitions to S508.

In S508, the subsystem control unit 90 hides the battery remaining power displayed on the display panel 29 in S503, S505, and S506 and ends the processing. That is, the battery remaining power is displayed on the display panel 29 in the predetermined period.

Figure 5:
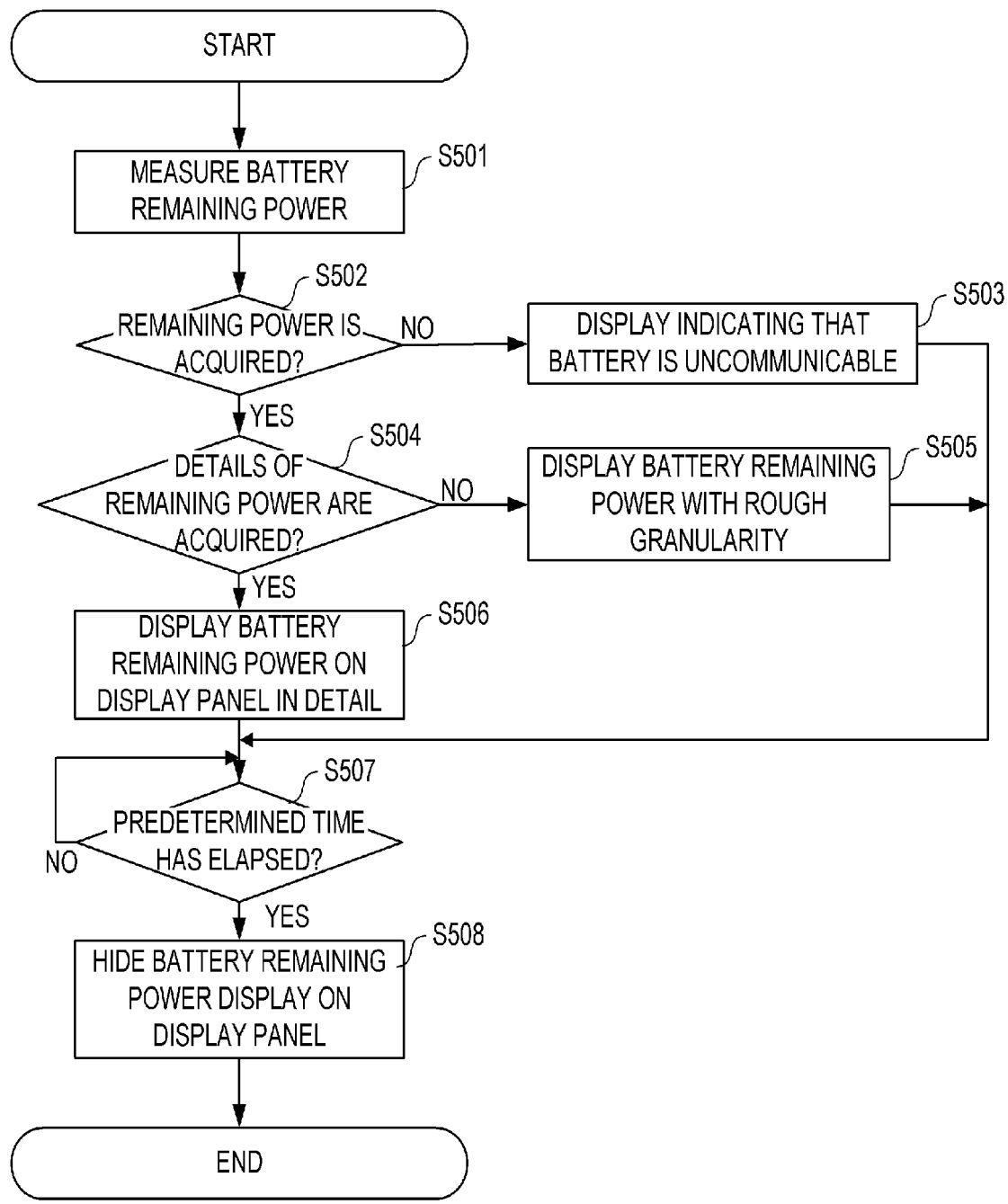
FIG. 5 is a detailed flowchart of battery remaining power display in the power-off state according to the first embodiment.

In the above explanation, the subsystem control unit 90 executes the processing indicated by the flowchart of FIG. 5. However, the system control unit 50 may execute the processing. That is, in S404, the subsystem control unit 90 may perform control to start (operate; activate) the system control unit 50 simultaneously with an event notification to the effect that new battery mounting is performed. The system control unit 50 may execute the processing. In this case, when the processing indicated by the flowchart of FIG. 5 ends, the system control unit 50 automatically stops operation and causes the subsystem control unit 90 to operate (activate).

(Flow of Battery Remaining Power Display in the Power-On State)

Figure 6:
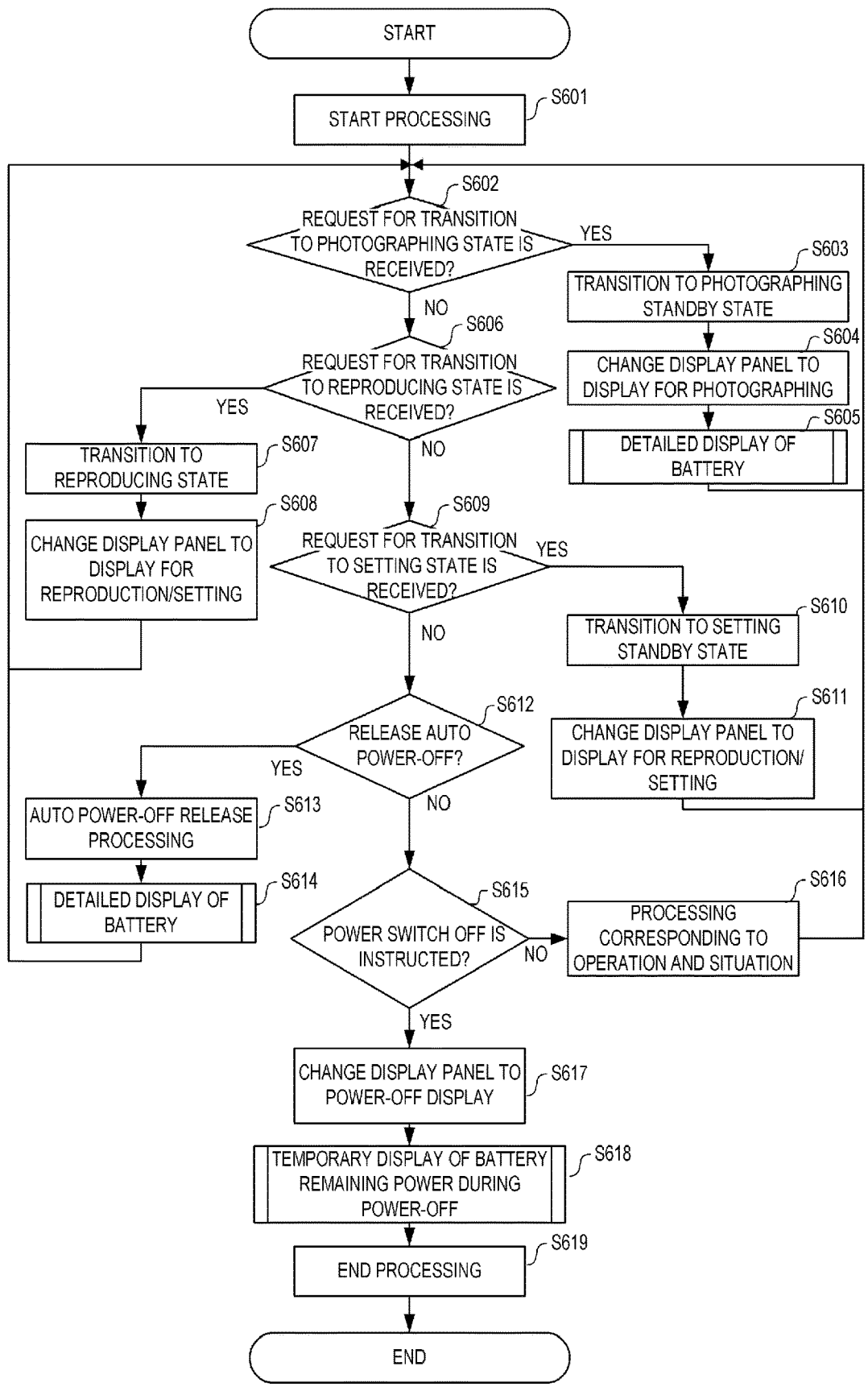
FIG. 6 is a display flowchart of battery remaining power in a power-on state according to the first embodiment.

A control method of battery remaining power in the ON state of the power switch 74 is explained with reference to flowcharts of FIGS. 6 to 8. In this embodiment, the power-on state of the digital camera 100 includes the photographing state for photographing a moving image and a still image, the reproducing state for reproducing photographed image data, and the setting state for performing setting of a main body of the digital camera 100 and the like. First, a control method of battery remaining power display from turn-on to turn-off of the power switch 74 is explained with reference to the flowchart of FIG. 6. When the power switch 74 is changed from OFF to ON, the flowchart of FIG. 6 is started. This processing is realized by the system control unit 50 developing, in the system memory 52, a program recorded in the nonvolatile memory 56 and executing the program. It is assumed that, if the power switch 74 is on, battery remaining power display with rough granularity (simple display) is performed on the display panel 29 and the liquid crystal monitor 27. In the state in which the power switch 74 is on, battery remaining power does not need to be displayed on both of the display panel 29 and the liquid crystal monitor 27. The battery remaining power may be displayed only on the display panel 29 or may be displayed only on the liquid crystal monitor 27.

In S601, the system control unit 50 performs start processing of the digital camera 100.

In S602, the system control unit 50 determines whether a request for transition to the photographing state is received. The process transitions to S603 when the request for transition to the photographing state is received and transitions to S606 when the request is not received. It is assumed that the request for transition to the photographing state, a request for transition to the reproducing state, and a request for transition to the setting state are input from the instructing unit 70 and the shutter button 61.

In step S603, the system control unit 50 changes the state of the digital camera 100 to the photographing standby state (a photographing mode).

In S604, the system control unit 50 instructs the subsystem control unit 90 to change the display of the display panel 29 to the display for photographing shown in (H) of FIG. 3. That is, various kinds of camera setting necessary for photographing such as shutter speed and ISO sensitivity are displayed on the display panel 29.

In S605, the system control unit 50 instructs the subsystem control unit 90 to temporarily display battery remaining power in detail. The process transitions to S602. In this embodiment, the detailed display of the battery remaining power is performed in a state in which the digital camera 100 is in the photographing standby state. However, the detailed display of the battery remaining power may be performed after the digital camera 100 further transitions from the photographing standby state to the photographing state. This means that the detailed display of the battery remaining power is temporarily performed when the digital camera 100 transitions from the reproducing state, the setting state, or the like to the photographing standby state or the photographing state. The photographing state only has to be a state in which the digital still camera 100 is performing an operation for photographing a moving image and a still image. Therefore, the photographing state may be a state including the photographing standby state. S605 is explained in detail below with reference to FIG. 7.

In S606, the system control unit 50 determines whether a request for transition to the reproducing state is received. The process transitions to S607 when the request for transition to the reproducing state is received and transitions to S609 when the request is not received.

In S607, the system control unit 50 changes the state of the digital camera 100 to the reproducing state (a reproducing mode).

In S608, the system control unit 50 instructs the subsystem control unit 90 to change the display of the display panel 29 to display of the reproducing and setting state shown in (I) of FIG. 3. The process transitions to S602.

In S609, the system control unit 50 determines whether a request for transition to the setting state is received. The process transitions to S610 when the request for transition to the setting state is received and transitions to S612 when the request is not received.

In S610, the system control unit 50 changes the state of the digital camera 100 to the setting state (a setting mode).

In S611, the system control unit 50 instructs the subsystem control unit 90 to change the display of the display panel 29 to display of the reproducing and setting state shown in (I) of FIG. 3. The process transitions to S602.

In S612, the system control unit 50 determines whether to perform release of (return from) auto power-off (a sleep state). The process transitions to S613 when the release of the auto power-off is performed and transitions to S615 when the release of the auto power-off is not performed. The auto power-off indicates that the operation of the digital camera 100, in which operation from the instructing unit 70 or the like is not detected for a fixed time, is temporarily stopped. That is, a state in which the display panel 29 and the liquid crystal monitor 27 display nothing irrespective of the state in which the power switch 74 is on is considered to be a state of the auto power-off.

In S613, the system control unit 50 performs release processing of the auto power-off.

In S614, the system control unit 50 instructs the subsystem control unit 90 to temporarily display battery remaining power in detail. The process transitions to S602. S614 is explained in detail below with reference to FIG. 7.

In S615, the system control unit 50 determines whether an instruction for turning off the power switch 74 is given. The process transitions to S617 when the instruction for turning off the power switch 74 is given and transitions to S616 when the instruction for turning off the power switch 74 is not given.

In S616, the system control unit 50 performs processing corresponding to user operation from the instructing unit 70 or the shutter button 61 or the state of the digital camera 100. The process transitions to S602.

In S617, the system control unit 50 instructs the subsystem control unit 90 to change the display of the display panel 29 to display for power-off. That is, if the various camera setting necessary for photographing such as shutter speed and ISO sensitivity are displayed on the display panel 29 as shown in (H) of FIG. 3, control for hiding the camera setting is performed.

In S618, the system control unit 50 instructs the subsystem control unit 90 to perform display processing of battery remaining power during power-off for changing battery remaining power display displayed on the display panel 29 to detailed display. This processing is the same as the processing explained with reference to FIG. 5. In this way, the system control unit 50 displays battery remaining power in detail at timing when a series of photographing work or reproducing work is completed and the power supply is turned off. Consequently, the user can accurately determine whether it is better to charge or replace the battery before the user uses the digital camera 100 next time.

In S619, the system control unit 50 performs end processing and shifts to the power-off state. That is, the display panel 29 and the liquid crystal monitor 27 shift to a state in which battery remaining power display is not performed. When the system control unit 50 shifts to the power-off state, the processing shown in FIG. 4 explained above is performed by the subsystem control unit 90.

((Detailed Flow of Battery Remaining Power Display))

Details of detailed display of battery remaining power displayed during a start, which is processing corresponding to S605 and S614 explained above, are explained with reference to the flowchart of FIG. 7. Processing for displaying detailed battery remaining power shown in (B) of FIG. 3 on the liquid crystal monitor 27 and the display panel 29 is performed. This processing is realized by the subsystem control unit 90 developing, in the system memory 52, a program recorded in the nonvolatile memory 56 and executing the program. It is assumed that the subsystem control unit 90 performs the processing indicated by the flowchart of FIG. 7 on the basis of an instruction of the system control unit 50. However, the system control unit 50 may perform the processing.

In S701, the subsystem control unit 90 acquires remaining power of the battery 86 measured by the measurer 82.

In S702, the subsystem control unit 90 determines whether the remaining power of the battery 86 is acquired at granularity finer than predetermined granularity. The process transitions to S703 when the remaining power is acquired at the fine granularity. The subsystem control unit 90 ends the processing when the remaining power is not acquired at the fine granularity. In this embodiment, the subsystem control unit 90 determines whether the remaining power is acquired at the fine granularity according to whether the remaining power is acquired at granularity equal to or more than one hundred stages. In this embodiment, since S702 is exceptional processing, the process transitions to S703, for example, unless an abnormal situation such as noise in the remaining power of the battery 86 that should be acquired occurs because of some reason.

In S703, the subsystem control unit 90 determines whether battery remaining power display is present on the display panel 29. The process transitions to S704 when the battery remaining power display is present and transitions to S705 when the battery remaining power display is absent. The subsystem control unit 90 performs this determination in order to prevent the display panel 29 to perform the battery remaining power display, for example, when the user performs setting for not performing the battery remaining power display on the display panel 29. The determination is performed in S705, S708, and S710 explained below because of the same reason. Therefore, the subsystem control unit 90 may determine, referring to setting temporarily saved in the system memory 52, whether there is the setting for performing the battery remaining power display on the display panel 29 rather than determining whether the battery remaining power display is present on the display panel 29.

In S704, the subsystem control unit 90 displays detailed battery remaining power on the display panel 29. The process transitions to S705.

In S705, the subsystem control unit 90 instructs the system control unit 50 to determine whether the battery remaining power display is present on the liquid crystal monitor 27. The process transitions to S706 when the battery remaining power display is present and transitions to S707 when the battery remaining power display is absent.

In S706, the subsystem control unit 90 instructs the system control unit 50 to display detailed battery remaining power on the liquid crystal monitor 27. The process transitions to S707.

In S707, the subsystem control unit 90 determines whether a predetermined period (time) has elapsed after the detailed battery remaining power is displayed on the liquid crystal monitor 27 and the display panel 29 in S704 and S706. The process transitions to S708 when the predetermined period has elapsed and stays on standby in S707 until the predetermined period elapses when the predetermined period has not elapsed. Thereafter, the process transitions to S708. Steps S703 and S704 and steps S705 and S706 may be carried out in parallel. The process only has to transition from S707 to S708 when the predetermined period elapses from steps S703 and S704 or steps S705 and S706 that end later.

In S708, the subsystem control unit 90 determines whether battery remaining power display is present on the display panel 29. The process transitions to S709 when the battery remaining power display is present and transitions to S710 when the battery remaining power display is absent.

In S709, the subsystem control unit 90 displays the battery remaining power with rough granularity shown in (A) of FIG. 3 on the display panel 29. The process transitions to S710.

In S710, the subsystem control unit 90 instructs the system control unit 50 to determine whether battery remaining power display is present on the liquid crystal monitor 27. The process transitions to S711 when the battery remaining power display is present. The subsystem control unit 90 ends the processing when the battery remaining power display is absent.

In S711, the subsystem control unit 90 instructs the system control unit 50 to display the battery remaining power with rough granularity on the liquid crystal monitor 27 and ends the processing. Steps S708 and S709 and steps S710 and S711 may be carried out in parallel.

Figure 7:
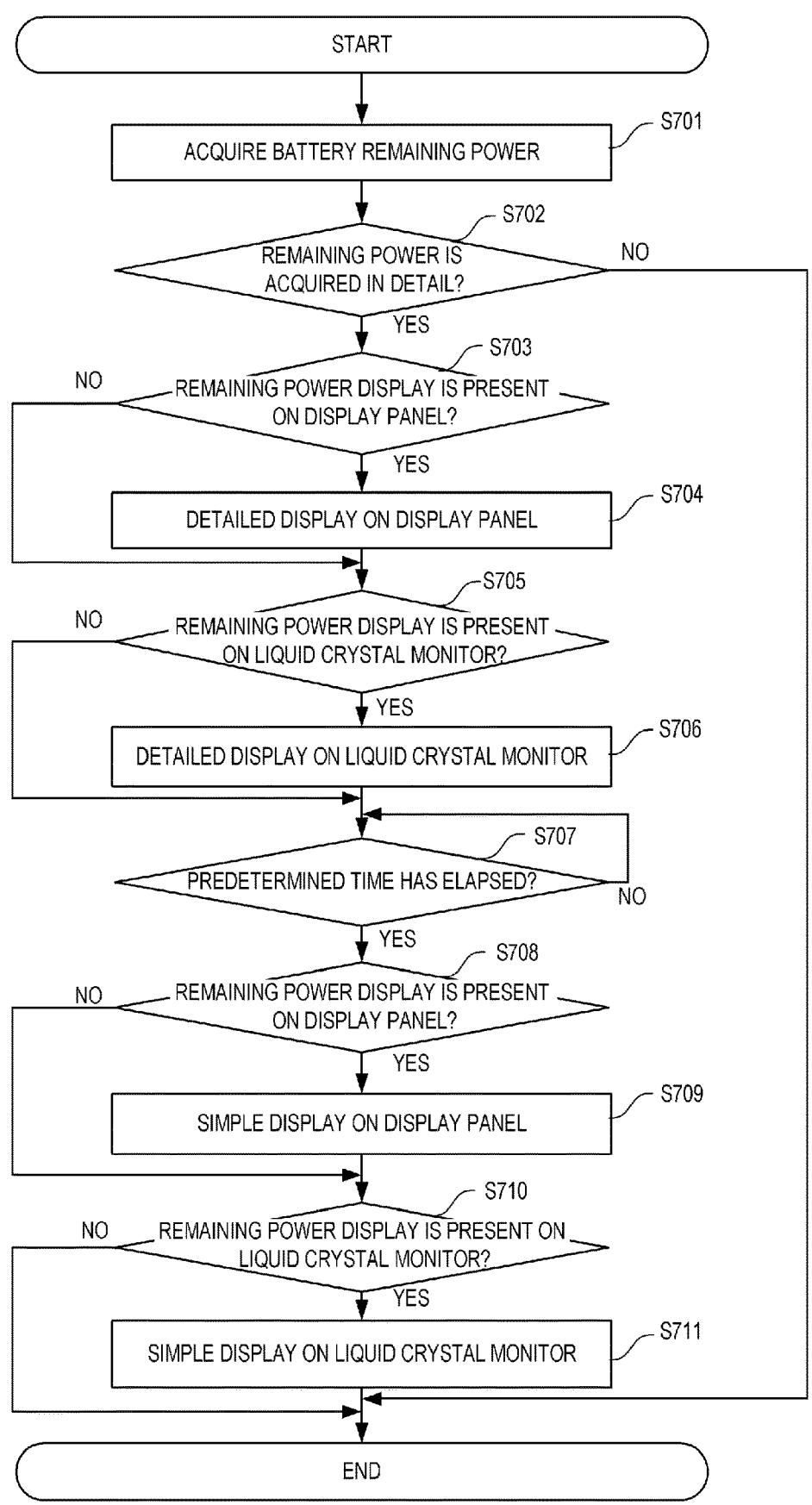
FIG. 7 is a detailed flowchart of battery remaining power display in the power-on state according to the first embodiment.
Figure 8:
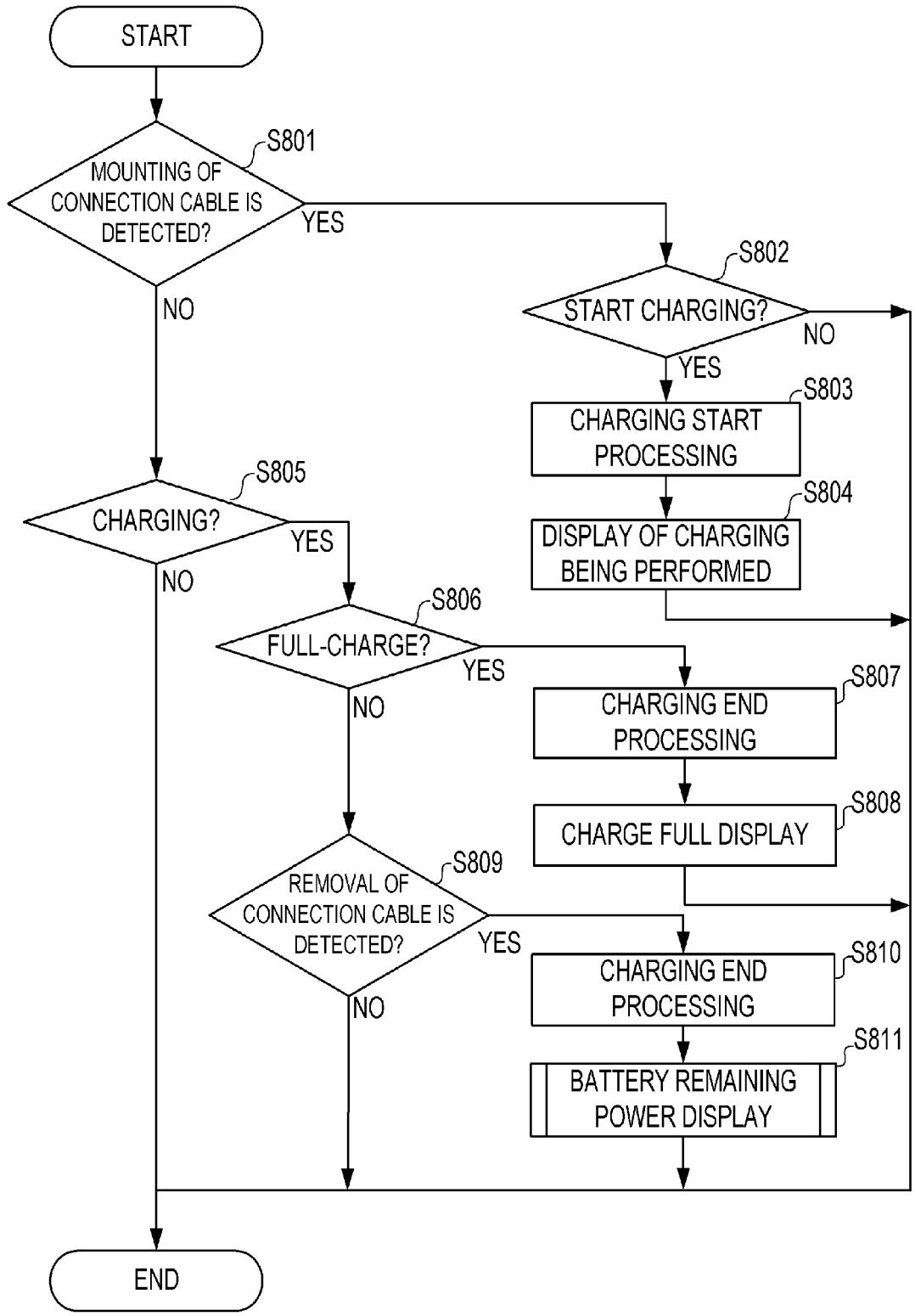
FIG. 8 is a display flowchart of battery remaining power during charging in the power-on state according to the first embodiment.

In this way, immediately after the transition to the photographing standby state (or the photographing state) (S605) and immediately after the release of the auto power-off (S614), the subsystem control unit 90 performs the detailed display processing of the battery remaining power shown in FIG. 7 and displays the battery remaining power in detail for the predetermined period. Consequently, immediately after the transition to the photographing standby state, the user can accurately determine whether battery remaining power is sufficient for photographing work to be performed or it is better to perform charging or battery replacement. Therefore, it is possible to reduce likelihood that battery capacity insufficiency unintendedly occurs during photographing work, photographing cannot be performed, and a photographing opportunity is lost. Immediately after the release of the auto power-off, the user can accurately grasp a degree of battery power remaining as a result of consuming the battery remaining power in a non-operation period until the auto power-off. The non-operation period until the auto power-off is considered to be a period in which the user does not pay attention to the digital camera 100. Therefore, the user can accurately determine whether it is better to perform charging or battery replacement for work to be performed. Immediately after switching from the power-off state to the power-on state (S601), the detailed display of the battery remaining power of the battery 86 may be performed for the predetermined period to allow the user to accurately determine whether it is better to perform charging or battery replacement for work to be performed. For example, the predetermined period may be a fixed time such as one minute or two minutes, may be a period until the user operates the instructing unit 70 or the like of the digital camera 100, or may be an earlier or later period of the fixed time and the period. Further, for example, when the digital camera 100 (the electronic apparatus) includes a sensor that detects a line of sight, the predetermined period may be a period until the line of sight of the user is directed to the display panel 29 or a period until the fixed time further elapses after the line of sight is directed to the display panel 29. With such a predetermined time, a period in which the user confirms detailed battery remaining power display is secured. Then, for example, unnecessary power consumption can be reduced.

((Flow of Battery Remaining Power Display During Charging))

A control method for battery remaining power display involving charging processing in the ON state of the power switch 74 is explained with reference to a flowchart of FIG. 8. Processing indicated by the flowchart of FIG. 8 is carried out in parallel to the processing indicated by the flowchart of FIG. 6. That is, in the ON state of the power switch 74, the battery remaining power display corresponding to the various requests from the instructing unit 70 shown in FIG. 6 is determined. Further, battery remaining power display corresponding to mounting of the connection cable 111 and implementation of charging of the charger 83 shown in FIG. 8 is determined. It is assumed that the subsystem control unit 90 always repeatedly carries out the processing indicated by the flowchart of FIG. 8. The processing indicated by the flowchart may be started at timing when a determination result in the flowchart of FIG. 8 changes, for example, when the connection cable 111 is inserted or removed or a charging state of the battery 86 changes. This processing is realized by the subsystem control unit 90 developing, in the system memory 52, a program recorded in the nonvolatile memory 56 and executing the program.

In S801, the subsystem control unit 90 determines whether the connection cable 111 for charging the battery 86 is mounted on the connection cable I/F 95 anew. The process transitions to S802 when the connection cable 111 is mounted anew and transitions to S805 when the connection cable 111 is not mounted anew.

In S802, the subsystem control unit 90 determines on the basis of states of the battery 86 and the connection cable 111 whether to start charging of the battery 86. The process transitions to S803 when the charging of the battery 86 is started. The subsystem control unit 90 ends the processing when the charging is not started.

In S803, the subsystem control unit 90 instructs the charger 83 to start charging to the battery 86.

In S804, the subsystem control unit 90 performs display shown in (D) of FIG. 3 indicating that charging is being performed on the display panel 29, instructs the system control unit 50 to perform display shown in (D) of FIG. 3 on the liquid crystal monitor 27, and ends the processing.

In S805, the subsystem control unit 90 determines whether charging is being performed. The process transitions to S806 when the charging is being performed. The subsystem control unit 90 ends the processing when the charging is not being performed.

In S806, the subsystem control unit 90 determines whether the charging state of the battery 86 is full-charge. The process transitions to S807 when the charging state is the full-charge and transitions to S809 when the charging state is not the full-charge.

In S807, the subsystem control unit 90 instructs the charger 83 to stop the charging to the battery 86.

In S808, the subsystem control unit 90 performs display shown in (E) of FIG. 3 indicating that the charging state is the full-charge on the display panel 29, instructs the system control unit 50 to perform display shown in (E) of FIG. 3 on the liquid crystal monitor 27, and ends the processing.

In S809, the subsystem control unit 90 determines whether the connection cable 111 for charging the battery 86 is removed from the connection cable I/F 95. The process transitions to S810 when the connection cable 111 is removed. The subsystem control unit 90 ends the processing when the connection cable 111 is removed.

In S810, the subsystem control unit 90 instructs the charger 83 to stop the charging to the battery 86.

In S811, the subsystem control unit 90 performs the same display processing as the display processing of the battery remaining power during the power-off. Specifically, this processing is the same as the processing indicated by the flowchart of FIG. 5 explained above. In this way, the battery remaining power is displayed in detail when the charging is suspended (stopped) before the full-charge. Consequently, the user can accurately determine whether the battery 86 is successfully charged to remaining power sufficient for using the digital camera 100 next time, that is, whether it is better to further continue the charging or replace the battery. In S811, the processing indicated by the flowchart of FIG. 7 may be performed rather than the processing of the flowchart of FIG. 5.

In the embodiment explained above, the digital camera 100 includes one battery. However, the digital camera 100 may include two or more batteries. In battery remaining power display performed when the two or more batteries are inserted, only the battery currently supplying electric power may be displayed or all the inserted batteries may be displayed. When the digital camera 100 can acquire battery remaining power of an accessory connected to the digital camera 100, the battery remaining power of the accessory may be displayed.

In the above explanation, the measurer 82 measures the battery remaining power. However, depending on a type of a battery, a control unit of the battery is capable of measuring the battery remaining power. When such a battery is mounted, rather than measuring the battery remaining power with the measurer 82 included in the digital camera 100, information concerning the battery remaining power may be acquired and displayed by communicating with the battery.

((Effects))

It is possible to take a more optimum appearance of battery remaining power display by determining the detailed display and the simple display of the battery remaining power according to the state of the power supply of the digital camera, the state of the charging of the battery, and the like in this way. Consequently, effects can be obtained, for example, power consumption by the display of the battery remaining power is reduced and the user can confirm the battery remaining power in detail when the user desires to confirm the battery remaining power.

(First Modification)

In the first embodiment, the battery remaining power display performed considering the request from the instructing unit 70 and the release of the auto power-off and further considering the display during the charging is explained. In a first modification, battery remaining power display performed considering only a state of the power supply and a change in the state of the power supply, mounting of the battery 86, and suspension of charging is explained. The configuration of the digital camera 100 in this modification is the same as the configuration in the first embodiment and is as shown in FIG. 2. In the following explanation, a flow of the battery remaining power display in this modification is explained with reference to FIG. 9. For simplification, it is assumed that battery remaining power display is not performed on the liquid crystal monitor 27 in this modification. It is assumed that the subsystem control unit 90 always repeatedly carries out processing indicated by a flowchart of FIG. 9. The flowchart may be started at timing when a determination result in the flowchart of FIG. 9 changes, for example, when switching of power-on and power-off is instructed from the power switch 74 or mounting of the battery 86 is detected. This processing is realized by the subsystem control unit 90 developing, in the system memory 52, a program recorded in the nonvolatile memory 56 and executing the program.

In S901, the subsystem control unit 90 determines a state of the power switch 74. The process transitions to S908 when the power switch 74 is on and transitions to S902 when the power switch 74 is off.

In S902, the subsystem control unit 90 determines whether the power switch 74 is operated and switching to the power-on state is instructed. The process transitions to S903 when the switching to the power-on state is instructed and transitions to S904 when the switching to the power-on state is not instructed.

In S903, the subsystem control unit 90 performs display of detailed battery remaining power on the display panel 29 for a predetermined period. That is, the subsystem control unit 90 switches the simple display or the hiding of the battery remaining power to the detailed display. In this modification, it is assumed that, irrespective of whether battery remaining power is already displayed on the display panel 29, the subsystem control unit 90 performs the display of the detailed battery remaining power on the display panel 29.

In S904, the subsystem control unit 90 controls the detector 81 and determines whether the battery 86 is mounted anew on the digital camera 100. The process transitions to S903 when the battery 86 is mounted anew and transitions to S905 when the battery 86 is not mounted anew.

In S905, the subsystem control unit 90 determines whether the battery 86 is being charged via the charger 83. The process transitions to S906 when the battery 86 is being charged and transitions to S907 when the battery 86 is not being charged.

In S906, the subsystem control unit 90 determines whether the charger 83 suspends the charging to the battery 86. Unlike the first embodiment, this determination is performed even in a state in which the battery 86 is fully charged. The process transitions to S903 when the charging to the battery 86 is suspended and transitions to S907 when the charging is not suspended.

In S907, the subsystem control unit 90 performs control not to display (hide) battery remaining power on the display panel 29.

In S908, the subsystem control unit 90 determines whether the battery 86 is being charged via the charger 83. The process transitions to S909 when the battery 86 is being charged and transitions to S910 when the battery 86 is not being charged.

In S909, the subsystem control unit 90 determines whether the charger 83 suspends the charging to the battery 86. Unlike the first embodiment, this determination is performed even in the state in which the battery 86 is fully charged. As in the first embodiment, this determination is performed according to whether the connection cable 111 is removed from the connection cable I/F 95. The process transitions to S903 when the charging to the battery 86 is suspended and transitions to S910 when the charging is not suspended.

In S910, the subsystem control unit 90 performs display of battery remaining power with rough granularity shown in (A) of FIG. 3 on the display panel 29.

According to such processing, detailed display of battery remaining power is performed in three cases, that is, "when the battery 86 is mounted on the digital camera 100 in the power-off state", "when the charging of the battery 86 is suspended", and "when the power-off state is switched to the power-on state". In other cases, simple display of battery remaining power is performed in the power-on state and battery remaining power is not displayed in the power-off state.

Figure 9:
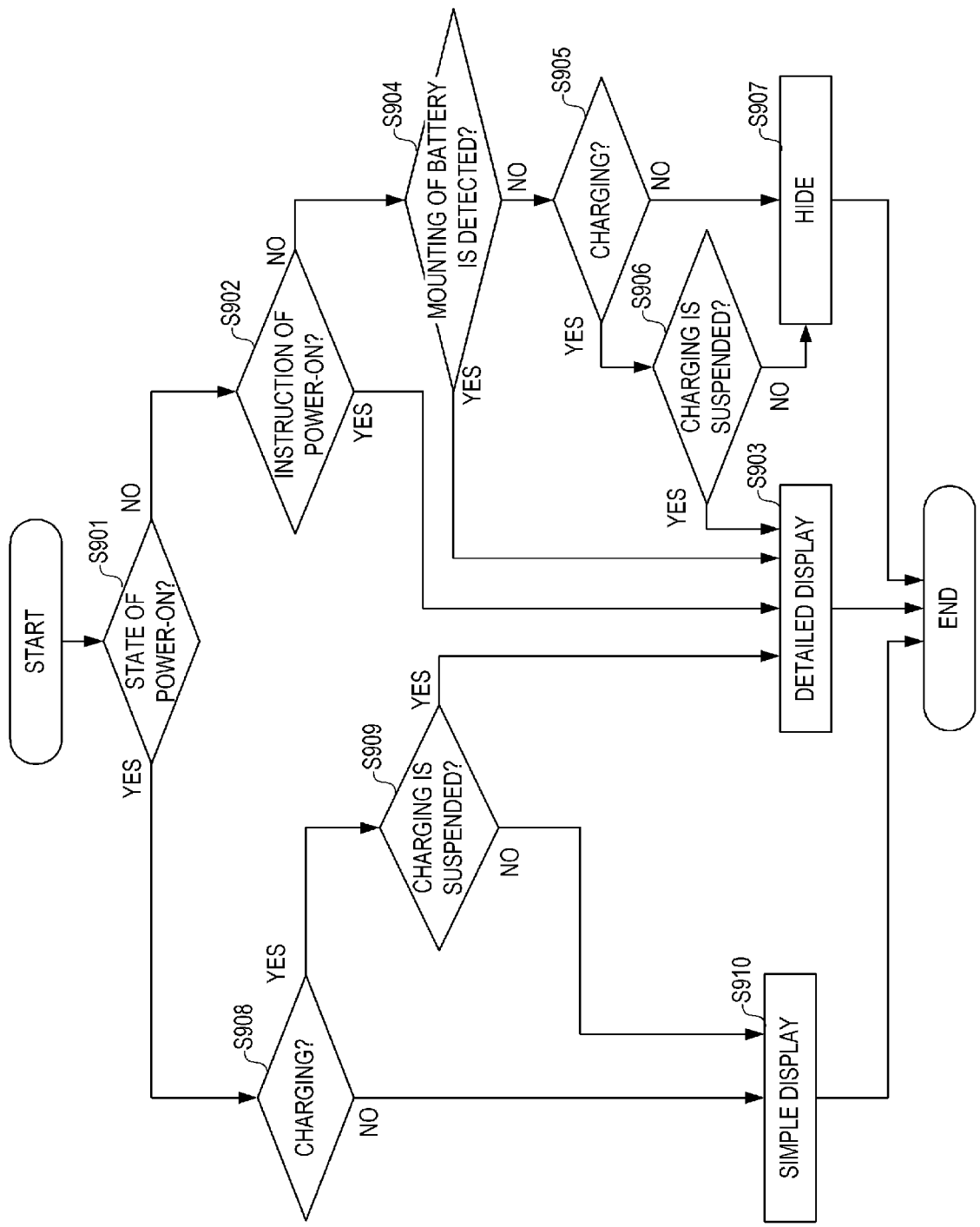
FIG. 9 is a display flowchart of battery remaining power according to a first modification.

In the above explanation, the subsystem control unit 90 performs the processing indicated by the flowchart of FIG. 9. However, the system control unit 50 may perform the processing. In this case, as in the first embodiment, in the power-off state, the system control unit 50 only has to operate according to control from the subsystem control unit 90. The same control unit does not need to perform the detailed display and the simple display of the battery remaining power. For example, the system control unit 50 may perform the detailed display of the battery remaining power. The subsystem control unit 90 may perform the simple display of the battery remaining power.

((Effects))

According to the first modification, it is possible to display battery remaining power with a configuration simpler than the configuration in the first embodiment and in a display appearance more appropriate than the display appearance in the first embodiment. The determination and the switching of the appearance of the battery remaining power display can be performed only by the subsystem control unit 90 without using the system control unit 50. Therefore, it is possible to reduce power consumption.

One kind of hardware may perform the various kinds of control explained as being performed by the system control unit 50 or the subsystem control unit 90. A plurality of kinds of hardware (e.g., a plurality of processors or circuits) may share processing to perform control of the entire apparatus.

The present invention is explained in detail above on the basis of the preferred embodiments of the present invention. However, the present invention is not limited to these specific embodiments. Various forms in a range not departing from the gist of the present invention are included in the present invention. Further, the embodiments explained above only indicate embodiments of the present invention. The embodiments can be combined as appropriate.

In the embodiment explained above, the example is explained in which the electronic apparatus according to the present invention is applied to the digital camera. However, the present invention is not limited to this example. The present invention is applicable to an electronic apparatus that displays a charging state of a battery. That is, the present invention is applicable to a personal computer, a PDA, a cellular phone terminal, a portable image viewer, a printer apparatus including a display, a digital photo frame, a music player, a game machine, an electronic book reader, and the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-089298, filed on May 7, 2018, which is hereby incorporated by reference herein in its entirety.

What is claimed is:

1. An electronic apparatus comprising:
a detector that detects whether a battery is mounted on a battery mounting unit of the electronic apparatus;
a first control circuitry that controls a display unit of the electronic apparatus to display a first display information indicating a remaining power of the battery, in a case where the electronic apparatus is in a power-on state; and
a second control circuitry that controls the display unit to display a second display information indicating the remaining power of the battery more detailed than that of the first display information, in a case where the battery is mounted on the battery mounting unit when the electronic apparatus is in a power-off state,
wherein the second control circuitry controls the display unit to stop displaying the second display information, in a case where a predetermined time elapses after the second display information is displayed on the display unit.

2. The electronic apparatus according to claim 1, wherein the second control circuitry that controls the display unit to display the second display information, in response to detecting an instruction to set the electronic apparatus in the power-on state.

3. The electronic apparatus according to claim 1, further comprising a charger that charges the battery,
wherein the second control circuitry that controls the display unit to display the second display appearance irrespective of a state of a power supply information, in a case where the charger stops charging the battery.

4. The electronic apparatus according to claim 1, wherein the second control circuitry that controls the display unit to display the second display appearance m case where information, in response to detecting an instruction to set the electronic apparatus in the power-off state.

5. The electronic apparatus according to claim 1, wherein the first display information indicates the remaining power of the battery in a plurality of stages equal to or less than ten stages.

6. The electronic apparatus according to claim 1, wherein the second display information indicates the remaining power of the battery in a percentage form.

7. The electronic apparatus according to claim 1, wherein the first control circuitry and the second control circuitry is included in one control circuitry.

8. The electronic apparatus according to claim 1, wherein the second control circuitry operates with lower power consumption than the first control circuitry.

9. The electronic apparatus according to claim 1, wherein the electronic apparatus includes a digital camera.

10. The electronic apparatus according to claim 1, wherein the electronic apparatus includes a phone.

11. A method comprising:
detecting of whether a battery is mounted on a battery mounting unit of an electronic apparatus;
controlling a display unit of the electronic apparatus to display a first display information indicating a remaining power of the battery, in a case where the electronic apparatus in a power-on state;
controlling the display unit to display a second display information indicating the remaining power of the battery more detailed than that of the first display information, in a case where the battery is mounted on the battery mounting unit when the electronic apparatus is in a power-off state;

controlling the display unit to stop displaying the second display information, in a case where a predetermined time elapses after the second display information is displayed on the display unit.

12. The method according to claim 11, further comprising controlling the display unit to display the second display information, in response to detecting an instruction to set the electronic apparatus in the power-on state.

13. The method according to claim 11, further comprising controlling the display unit to display the second display information, in a case where a charger of the electronic apparatus stops charging the battery.

14. The method according to claim 11, further comprising controlling the display unit to display the second display information, in response to detecting an instruction to set the electronic apparatus in the power-off state.

15. The method according to claim 11, wherein the first display information indicates the remaining power of the battery in a plurality of stages equal to or less than ten stages.

16. The method according to claim 11, wherein the second display information indicates the remaining power of the battery in a percentage form.

17. The method according to claim 11, wherein the electronic apparatus includes a digital camera.

18. The method according to claim 11, wherein the electronic apparatus includes a phone.

19. A non-transitory storage medium that stores a program causing a computer to execute a control method, the method comprising:

detecting whether a battery is mounted on a battery mounting unit of an electronic apparatus;

controlling a display unit of the electronic apparatus to display a first display information indicating a remaining power of the battery, in a case where the electronic apparatus in a power-on state;

controlling the display unit to display a second display information indicating the remaining power of the battery more detailed than that of the first display information, in a case where the battery is mounted on the battery mounting unit when the electronic apparatus is in a power-off state;

controlling the display unit to stop displaying the second display information, in a case where a predetermined time elapses after the second display information is displayed on the display unit.

* * * * *